UNITED STATES PATENT OFFICE.

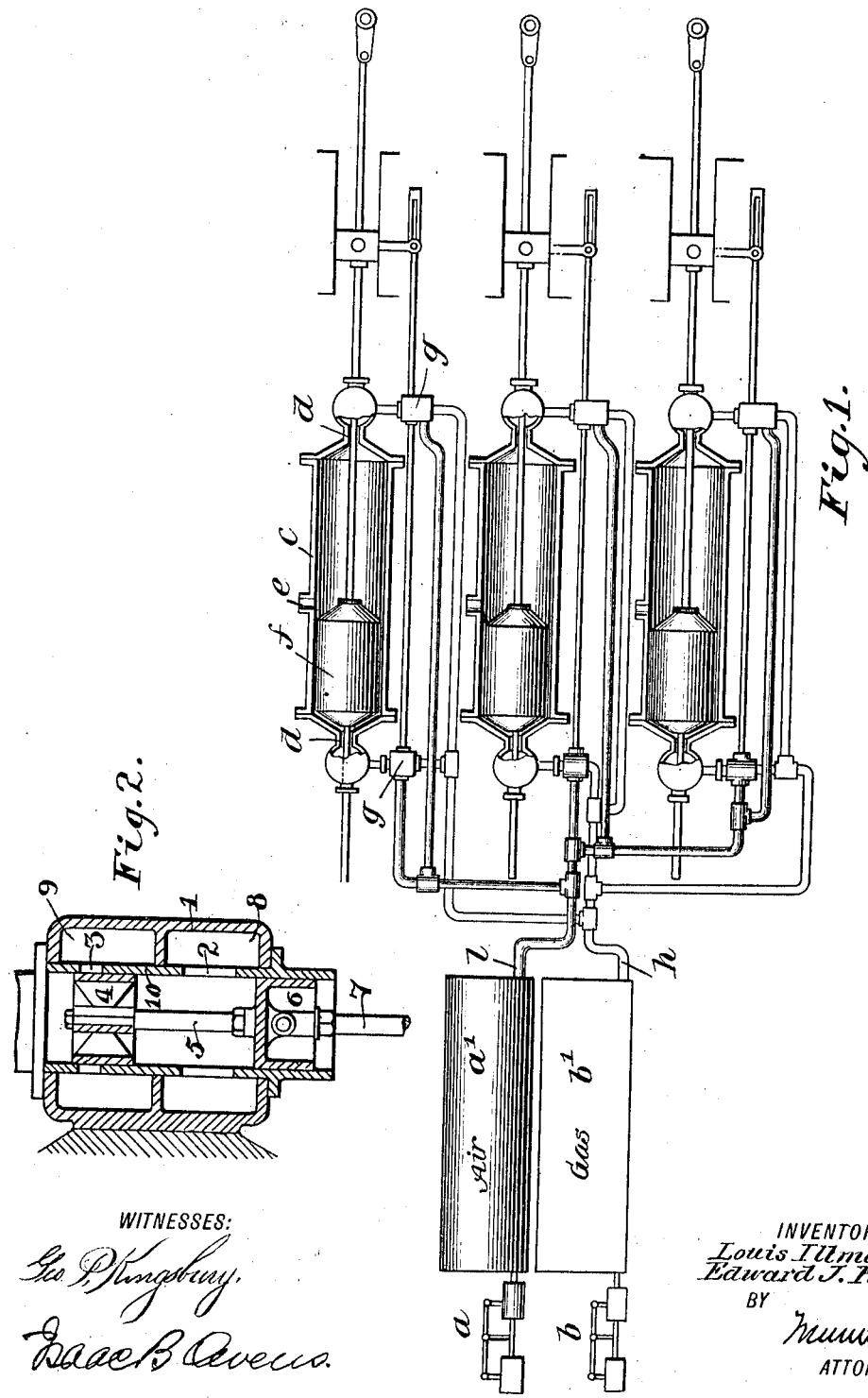

LOUIS ILLMER, JR., AND EDWARD J. KUNZE, OF NEW YORK, N. Y., ASSIGNORS, BY DIRECT AND MESNE ASSIGNMENTS, TO ILLMER GAS ENGINE COMPANY, A CORPORATION OF DELAWARE.

INTERNAL-COMBUSTION POWER PLANT.

1,048,697.     Specification of Letters Patent.     Patented Dec. 31, 1912.

Application filed September 9, 1904. Serial No. 223,878.

*To all whom it may concern:*

Be it known that we, LOUIS ILLMER, Jr., and EDWARD J. KUNZE, both citizens of the United States, and residents of the city of New York, borough of the Bronx, in the county and State of New York, have invented a new and Improved Internal-Combustion Power Plant, of which the following is a full, clear, and exact description.

This invention relates to a new plant for the more efficient treatment of fuel for the production of mechanical energy, and is particularly adapted to large power plants.

The object of the invention is to effect economy and simplification of construction in the pumping side of a gas engine power plant involving a plurality of independent engines. We attain this end by providing the plurality of engines with a single or centralized gas pump and a single or centralized air pump. The pumps being driven independently and compressing the air and gaseous fuel separately and sufficiently to give these elements mobility to the several engines; the air and gaseous fuel then passes in separate mains to the power cylinders of the several engines where part of the air is mixed with the gaseous fuel to form a combustible mixture, and this mixture and the remaining part of the air being introduced into the power cylinders of the engines in successive bodies, a portion of the air being used to scavenge the power cylinders and the mixture taking its place in the power cylinders and being further compressed, then ignited and expanded in and exhausted from the power cylinders in the usual manner.

Reference is had to the accompanying drawing showing the system in connection with a power plant of double acting two cycle engines, in which—

Figure 1 is a diagram showing a plant of three engines and illustrating their connection with the single independent air compressor and the single independent gaseous fuel compressor and the piping means for distributing the air and gaseous fuel to the engine cylinders. Fig. 2 is an enlarged detail section of one of the mixing valves with indications thereon of the course of the air and gaseous fuel.

Referring to Fig. 1, the element $a$ may be taken to illustrate an air pump and $b$ a gaseous fuel pump which may be operated independently by any suitable drive; $a'$ and $b'$ indicate respectively, air and gaseous fuel tanks communicating respectively with the pumps. The engines may be of any appropriate type, and according to the example here given, they are double acting two cycle engines, each comprising a power cylinder $e$ having an inlet port $d$ at each end and an intermediately located exhaust port $e$. The inlet ports $d$ are commanded by inlet valves, and $g$ indicates mixing and stratifying valves which control the passages to the feed ports and are arranged to operate so as to admit into the power cylinder ends, alternate bodies of scavenging air and of a mixture of air and gaseous fuel, said valves being susceptible of regulation to vary the ratio of said mixture and scavenging air volumes. The valves $g$ may be of any desired type, for example, that shown in Fig. 2. Within the casing 1 is a tubular seat 10 and the casing is provided with an air chamber 8 and a gaseous fuel chamber 9. The air chamber 8 communicates with the interior of the valve seat 10 by relatively large air ports 2 and the gaseous fuel chamber 9 communicates with the interior of the seat 10 by relatively small ports 3. The mixing valve proper, 4, slides in its seat and is open through its center and connected to a stem 5, which in turn is joined to the head 6, and the parts 6 and 4 are given a reciprocating movement by a suitable mechanism. It is understood that we do not limit ourselves to this particular type of valve, as other devices accomplishing the same results may be used. From the air tank $a'$, mains $l$ lead with various branches passing respectively to the air ports of each of the several valves $g$, and from the gaseous fuel tank $b'$, gas mains $h$ lead with various branches to the gaseous fuel ports of each of the several valves $g$.

The various engines of the plant are intended to operate with entire independence, and may be removed from or juxtaposed to each other as convenience requires. Each engine should be provided with controlling valves and the various other appurtenances, excepting air and gas pumps, complementary to power cylinders of internal combustion engines.

In the operation of the system, air and gaseous fuel are separately compressed in their respective mains and tanks $a'$ and $b'$ and kept stored therein at a pressure merely sufficient to give the air and gaseous fuel mobility through the various branch pipes of the mains $h$ and $l$ and the valves $g$, into and through the power cylinders $c$ of the engines. By means of the branch pipes of the main $l$, the compressed air is divided into several distinct bodies and these distinct bodies are conducted respectively to the various valves $g$. The same is true of the branch pipes of the gas main $h$, which divides the gaseous fuel into several bodies and conducts them respectively to the valves $g$. It will be seen therefore, that the air and gaseous fuel are divided into several distinct bodies and that one body of air and one body of gaseous fuel are separately conducted to each mixing valve of each engine. As these divided supplies of air and gaseous fuel flow by the valves $g$, said valves control these supplies to form alternate bodies of air and bodies of air and gaseous fuel mixture, whereby, upon opening the inlet port $d$, said bodies successively enter the cylinder, a part of said air body flowing into and through the cylinder to scavenge it and the body of air and gaseous fuel mixture taking its place in the cylinder. This mixture or working charge is then compressed, ignited and expanded against the piston to derive work therefrom, and finally exhausted from the cylinder in the usual manner.

Having thus fully described our invention, we claim:—

In a gas engine power plant, the combination of a plurality of independent power cylinders and their appurtenances, each cylinder having a piston adapted to compress its working charge prior to ignition, a mixing and stratifying valve for each power cylinder, said valves having air and gaseous fuel ports serving to dispose the air and gaseous fuel into alternate bodies of air and of a mixture of air and gaseous fuel, a centralized air pumping unit operated independently of all the power cylinders, means establishing communication between said pumping unit and the air ports of all of said mixing and stratifying valves, to deliver air thereto at a low pressure, and means for delivering gaseous fuel to the gaseous fuel ports of all of said mixing and stratifying valves also at a low pressure.

In testimony whereof we have signed our names to this specification in the presence of two subscribing witnesses.

LOUIS ILLMER, Jr.
EDWARD J. KUNZE.

Witnesses:
S. B. ROLFE,
A. M. PARROTT.

---

Copies of this patent may be obtained for five cents each, by addressing the "Commissioner of Patents, Washington, D. C."